United States Patent
Sadrolashrafi (10) Patent No.: US 9,202,077 B2
(45) Date of Patent: Dec. 1, 2015

(54) ENCRYPTION SOLUTION FOR PROTECTING FILE SYSTEMS IN MULTI-HOST CLUSTERS

(71) Applicant: Vormetric, Inc., San Jose, CA (US)

(72) Inventor: Masoud Sadrolashrafi, San Jose, CA (US)

(73) Assignee: Vormetric, Inc., San Jose, CA (US)

( * ) Notice: Subject to any disclaimer, the term of this patent is extended or adjusted under 35 U.S.C. 154(b) by 124 days.

(21) Appl. No.: 14/015,954

(22) Filed: Aug. 30, 2013

(65) Prior Publication Data

US 2014/0325214 A1    Oct. 30, 2014

Related U.S. Application Data

(60) Provisional application No. 61/816,598, filed on Apr. 26, 2013.

(51) Int. Cl.
*H04L 29/06*    (2006.01)
*G06F 21/62*    (2013.01)

(52) U.S. Cl.
CPC .................................. *G06F 21/6218* (2013.01)

(58) Field of Classification Search
CPC ......... G06F 21/00; G06F 21/60; G06F 21/62; G06F 21/6218; G06F 17/30224
USPC ......................................................... 713/165
See application file for complete search history.

(56) References Cited

U.S. PATENT DOCUMENTS

| | | | |
|---|---|---|---|
| 7,721,009 B2 | 5/2010 | Moreira et al. | |
| 8,732,346 B2 | 5/2014 | D'Amato et al. | |
| 8,892,531 B2 | 11/2014 | Kaplan et al. | |
| 2004/0107342 A1 | 6/2004 | Pham et al. | |
| 2009/0240705 A1 | 9/2009 | Miloushev et al. | |
| 2010/0146122 A1* | 6/2010 | Prince et al. | 709/226 |
| 2011/0296133 A1* | 12/2011 | Flynn et al. | 711/171 |
| 2014/0281545 A1* | 9/2014 | Erofeev et al. | 713/171 |

OTHER PUBLICATIONS

International Search Report, PCT/US2014/035684, mailed Feb. 17, 2015.

* cited by examiner

*Primary Examiner* — Yogesh Paliwal
(74) *Attorney, Agent, or Firm* — Womble Carlyle Sandridge & Rice LLP (57) ABSTRACT

A method of managing file security in a cluster environment is provided. The method includes passing a request for a file from a secure file system layer to a secure volume manager layer and locking at least a portion of the file as affected by the request, at a cluster file system layer. The method includes passing one or more keys from the secure file system layer to the secure volume manager layer. The method includes decrypting the file as received, in response to the request for the file including a read request for the file, prior to sending the decrypted file to the secure file system layer. The method includes encrypting the file as received, in response to the request for the file including a write request for the file, prior to sending the encrypted file to the input/output layer.

20 Claims, 6 Drawing Sheets

ENCRYPTION SOLUTION FOR PROTECTING FILE SYSTEMS IN MULTI-HOST CLUSTERS

This application claims benefit of priority from U.S. Provisional Application No. 61/816,598 filed Apr. 26, 2013, which is hereby incorporated by reference.

BACKGROUND

In a cluster environment for computing, multiple hosts have access to a shared storage. A cluster file system protects and assures data coherency by individually locking files, or portions of files, until each is released. Yet, the cluster file system may be unaware of security needs and unable to handle encryption and decryption of files or portions of files. Conversely, a security system performing encryption and decryption may be unaware of multiple access attempts to files from applications operating in a cluster environment. Therefore, there is a need in the art for a solution which overcomes the drawbacks described above.

SUMMARY

In some embodiments, a method of managing file security in a cluster environment, is provided. The method includes passing a request for a file from a secure file system layer through a cluster file system layer to a secure volume manager layer and locking at least a portion of the file as affected by the request, at the cluster file system layer, the locking preventing access by other requests. The method includes passing one or more keys from the secure file system layer to the secure volume manager layer. The method includes decrypting, via application of the one or more keys at the secure volume manager layer, the file as received, in response to the request for the file including a read request for the file, prior to sending the decrypted file to the secure file system layer. The method includes encrypting, via application of the one or more keys at the secure volume manager layer, the file as received, in response to the request for the file including a write request for the file, prior to sending the encrypted file to the input/output layer, wherein at least one method operation is executed through a processor. The method is embodied as a computer readable medium in some embodiments.

In some embodiments, a secure, cluster-based system is provided. The system includes a secure file system module and a secure volume manager, including at least one processor and configured to sandwich a cluster file system module. The secure file system module is configured to provide one of a read request or a write request from an application to the secure volume manager, via the cluster file system module, the one of the read request or the write request referencing a file. The secure file system module is configured to pass one or more keys down to the secure volume manager, pass a first unencrypted file as the file from the application to the secure volume manager, via the cluster file system module, in response to receiving the write request and pass a decrypted file as the file from the secure volume manager to the application, in response to receiving the read request. The secure volume manager is configured to produce the decrypted file via application of the one or more keys to a first encrypted file received as the file from a shared device, in response to receiving the read request and produce a second encrypted file via application of the one or more keys to the unencrypted file, in response to receiving the write request, the second encrypted file sent as the file to the shared device, wherein the cluster file system module locks, relative to the shared device, the file.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Aspects of a secure, cluster-based system are herein described. A secure file system cooperates with a secure volume manager to encrypt and decrypt secure files, while a cluster file system protects data coherency. The cluster file system, which can be a proprietary or a commercially available system such as the General Parallel File System (GPFS) by IBM (International Business Machines Corp.), locks and unlocks files or portions of files for read or write access. The secure file system and the secure volume manager, which sandwich the cluster file system, handle keys, encryption and decryption when the file type of a file indicates the file is a secure file. Security and coherency are thus provided for in a cluster-based system in accordance with the embodiments described herein.

An encryption solution for protecting file systems in multi-host clusters is herein presented. FIGS. 1-6 and associated disclosure describe the high level architecture of a solution for protecting GPFS file systems or other cluster file systems in multi-host clusters. The terms GuardPoint and guard are used herein. In some embodiments, GuardPoint refers to an entire or a selected region of file system namespace protected by an agent, such as the Vormetric Agent of the assignee. The terms guard and unguard are similar to mount and un-mount, which respectively enable or disable protection on GuardPoints in some embodiments. Access to a guarded GuardPoint is governed by policies defined on the DSM (data security manager) for the GuardPoint. If a policy specifies encryption, the key associated with the GuardPoint is used for encryption of user data on disk.

The solution described herein operates in clustered mode over GPFS or other cluster file systems. Various embodiments perform cluster-aware operations in clustered mode and support the same features available on non-cluster file systems. Features specific to GPFS are:

High availability of Vormetric service over GPFS for policy and guard enforcements Cluster-wide consistency of policies and keys on active members of a GPFS cluster Cluster-wide monitoring and configuration changes to host membership as related to Vormetric Data consistency in read and write operations, regardless of I/O (input/output) access method, I/O size or offset, or I/O concurrency to the same file from multiple nodes.

In some embodiments, an administration model for managing clusters on the DSM is based on cluster host groups. A cluster group is a group of hosts that belong to the same GPFS cluster or other cluster file system cluster. Each cluster is associated with a unique cluster host group configuration on the DSM in some embodiments. Each node of a cluster has a corresponding host definition on the DSM and membership to the cluster host group associated with the cluster file system cluster. Host membership to a cluster host group is flexible for separation of cluster administration and security administration in some embodiments. A host may join a cluster any time after the host's definition is added to the cluster host group. A host may also be added to a cluster before the host is registered with the DSM if GuardPoints are not enabled on the host in some embodiments.

The agent for cluster file system integrates with IBM RSCT (Reliable Scale Cluster Technology) to support clustering of multiple instances of the agents running in a cluster of cluster file system hosts in some embodiments. The agent for the cluster file system creates the peer domain, called VormetricDomain in some embodiments, on each node of a cluster file system cluster. A peer domain, managed within RSCT, is a cluster of hosts configured for high availability. A host configured for clustering joins the peer domain at RSCT startup. After joining the peer domain, the agents active in the peer domain establish a grouping through the Group Services (GSAPI or Group Services Application Programming Interface) subsystem of RSCT and each instance begins operating in clustered mode. Integration with RSCT enables active instances of the agents to operate as a single distributed system for cluster-wide management of security policies and GuardPoints. An instance of an agent can leave the group voluntarily or due to failure while the host continues to remain active in the peer domain and cluster file system cluster. Active instances are aware of membership status of their peers (e.g., JOINED, LEFT, FAILED) and participate in cluster-wide operations such as policy changes or guard/unguard operations.

Figure 1:
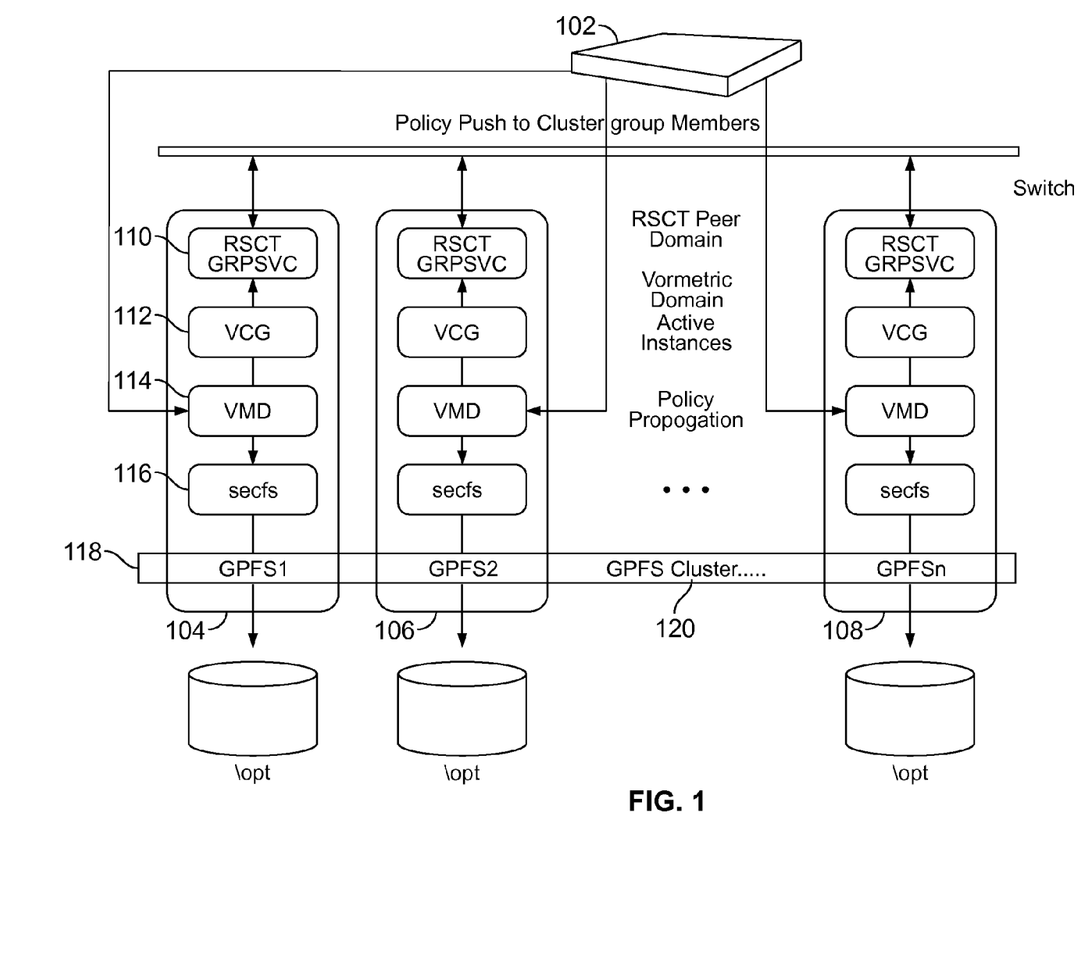
FIG. 1 is an architecture diagram depicting a high level architecture for policy propagations across a computing cluster in a secure, cluster-based system in accordance with some embodiments.

As shown in FIG. 1, The VMD 114 (Vormetric management daemon) subsystem is a component of the Vormetric agent that communicates with the DSM for local caching of policy and GuardPoint information. It should be appreciated that VMD 114 may be any management daemon and is not limited to the management daemon of the assignee as FIG. 1 is one example. In clustered mode this component (i.e., a VMD 114) also establishes or joins the group of other VMD 114 instances through Group Services over the peer domain.

The subsystem of the VMD 114 responsible for cluster-wide management service is called the Cluster Group (CG) 112. In some embodiments, the subsystem is the Vormetric Cluster Group (VCG) of the assignee. In clustered mode all active VMD 114 instances engage in a cluster-wide policy propagation process. Policy propagation occurs when a new instance joins the group and receives the policy for the cluster from the DSM 102, or the DSM 102 pushes new or updated policy to members of the cluster group.

Policy propagation is an atomic operation in some embodiments, which may mean a policy change is approved by all active instances, or the change is rejected if at least one instance does not agree with the change. An instance of an agent with loss of network connection to the DSM 102 would not receive policy updates from the DSM 102, and subsequently, the instance of the agent would vote no in response to a policy change request from other active instances. An active VMD 114 instance is delegated the primary role for Cluster Policy Management (CPM) in some embodiments. The primary instance initiates a policy propagation process for all members to vote on a policy change in some embodiments. A second instance can optionally be designated the secondary role for CPM. The secondary instance is automatically promoted to take over the primary role in the event of primary instance failure or departure from the group in some embodiments.

FIG. 1 depicts the high level architecture for policy propagation across a cluster 120. A policy push from the DSM 102 to each instance triggers the primary CPM (e.g., one of the VMDs 114) to initiate the policy propagation process. When the process completes, each instance approves the same policy at the same time instance when all instances independently apply the policy change through the secfs (secure file system) module 116 on each host 104, 106, 108 in some embodiments. The DSM 102 pushes policy to members of the cluster group in this embodiment. Each host 104, 106, 108 receives and processes policy information upon arrival. Non-primary members wait for the primary CPM (which may be one of the VMDs 114) to initiate a cluster-wide policy propagation process. The primary CPM initiates the policy propagation.

In the policy propagation process, each host 104, 106, 108 computes a hash code for the recently pushed policy in some embodiments. The primary CPM sends the computed hash code to members of the peer domain. The members compare the primary's hash code with the code computed locally. The members, including the primary CPM, approve or reject the policy propagation. Post propagation, the policy is committed if all hosts 104, 106, 108 agree on the hash code. In other embodiments, the policy is rejected if any host does not agree with the hash code of the policy change.

The agent may also rely on the RSCT framework for enabling/disabling GuardPoints in cluster-wide context over a cluster file system, such as GPFS1 118. When the command to enable a GuardPoint is issued on a host 104, 106, 108, the GuardPoint is automatically enabled or disabled on other hosts. A cluster-wide guard operation is atomic in some embodiments, therefore that GuardPoint is enabled or disabled on all active hosts or that GuardPoint cannot be enabled or disabled on any host. This guarantees consistent view and data coherency to protected files under GuardPoints from any host in a cluster 120.

Figure 2:
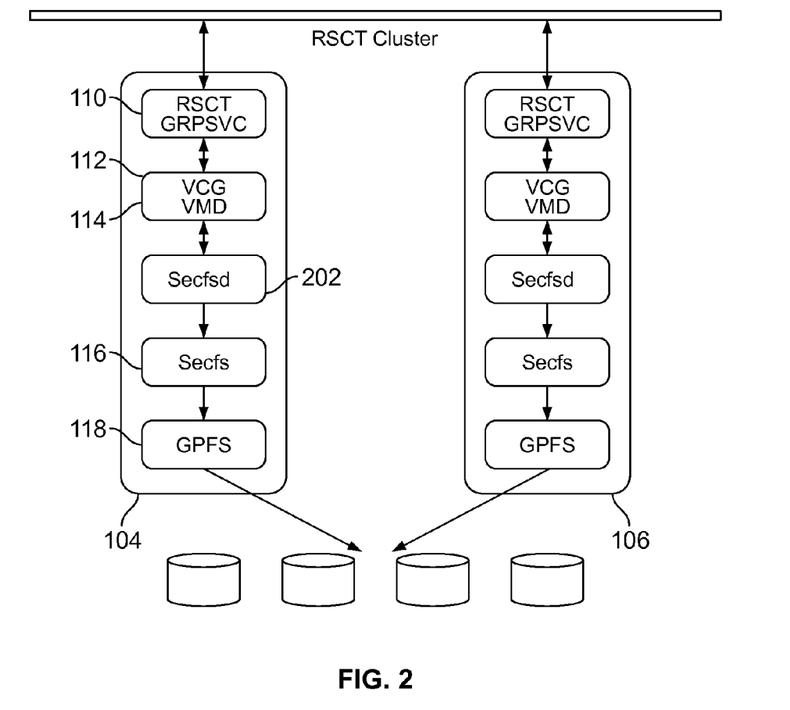
FIG. 2 is an architecture diagram showing the enabling and disabling of security in a cluster-wide context over cluster file systems in a computing cluster such as shown in FIG. 1 in accordance with some embodiments.

FIG. 2 depicts the high level architecture for cluster-wide guard or unguard operations. A request to the secfsd 202 (secure file system daemon, which could be a command line interpreter or other suitable process) with a command for enabling GuardPoint triggers the local VMD/VCG 114/112 to initiate a cluster-wide guard process. In some embodiments, there are two phases in this process. In phase 1, each VMD/VCG 114/112 instance requests the local secfsd 202 process to enable GuardPoint in blocking access mode on the local host 104, 106. The restriction in access is necessary to prevent user access to GuardPoint as it may not be guarded on other nodes. When GuardPoint is enabled in blocking access mode on all hosts, the cluster-wide guard process transitions to the final phase during which each secfsd 202 instance independently removes the restricted access to GuardPoint imposed in phase 1.

Still referring to FIG. 2, when the Guard Administration is initiated, the user runs secfsd-guard or -unguard (i.e., enable or disable security per the secure filesystem daemon) on GuardPoint. It should be appreciated that GuardPoint information is available to secfsd 202 and secfs 116. The request for guard is forwarded to the VMD/VCG 114/112 that is active on the current node. The VCG 112 initiates a proposal to all active nodes to perform a cluster-wide guard operation. In distributed Guard processing, the VCG module 112 on each host 104, 106 receives and processes the guard proposal. The local secfsd 202 performs a local guard operation on the target directory name (GuardPoint). The secfsd 202 informs the VCG 112 of the operation status. To enable or disable access to GuardPoint, all hosts 104, 106, 108 enabled GuardPoint, or at least one host could not enable GuardPoint. Upon failure, the proposal to enable is withdrawn and GuardPoint is disabled completely. Upon approval vote from all hosts 104, 106, 108, the VCG 112 which has initiated the proposal instructs all hosts to enable access to GuardPoint. In cluster mode the default behavior for enabling/disabling GuardPoints is cluster-wide, unless the -local flag is specified at the command line by an administrator in some embodiments.

The agent, such as the Vormetric Agent, also utilizes the callback mechanism of GPFS 118 for immediate availability of GuardPoints when a file system is mounted. Availability of GuardPoints applies to file systems configured for manual or automatic mounts during mmstartup (e.g., a startup routine). Because of integration with the GPFS 118 callback service, GuardPoints on GPFS 118 must be configured for manual operation, in one embodiment.

The layering architecture of secfs 116 over protected file systems intercepts application I/O requests to protected file systems for encryption. In general, the secfs module 116 assumes that the underlying file system (e.g., GPFS 118 or other cluster file system) performs its own locking for read, write, update, and truncate operations to ensure data and metadata consistency in a cluster wide context. For the most part, the secfs module 116 can leverage the locking performed by the GPFS 118 or other cluster file system to eliminate the need for a distributed lock management within secfs 116. However, there are few situations in which secfs 116 would need a cluster-wide lock held across a sequence of consecutive operations to GPFS1 118 to ensure data consistency and avoid data corruption. It should be appreciated that most cases of reads and writes do not require distributed locks held in secfs except write operations to unaligned files or unaligned writes to files. Addition of a distributed lock manager to secfs 116 might be too complex and redundant due to the distributed lock management within GPFS1 118. As such, the architecture for protecting a cluster file system does not intercept I/O requests and pushes down encryption to block level, below the cluster file system, while maintaining encryption at file level granularity.

Figure 3:
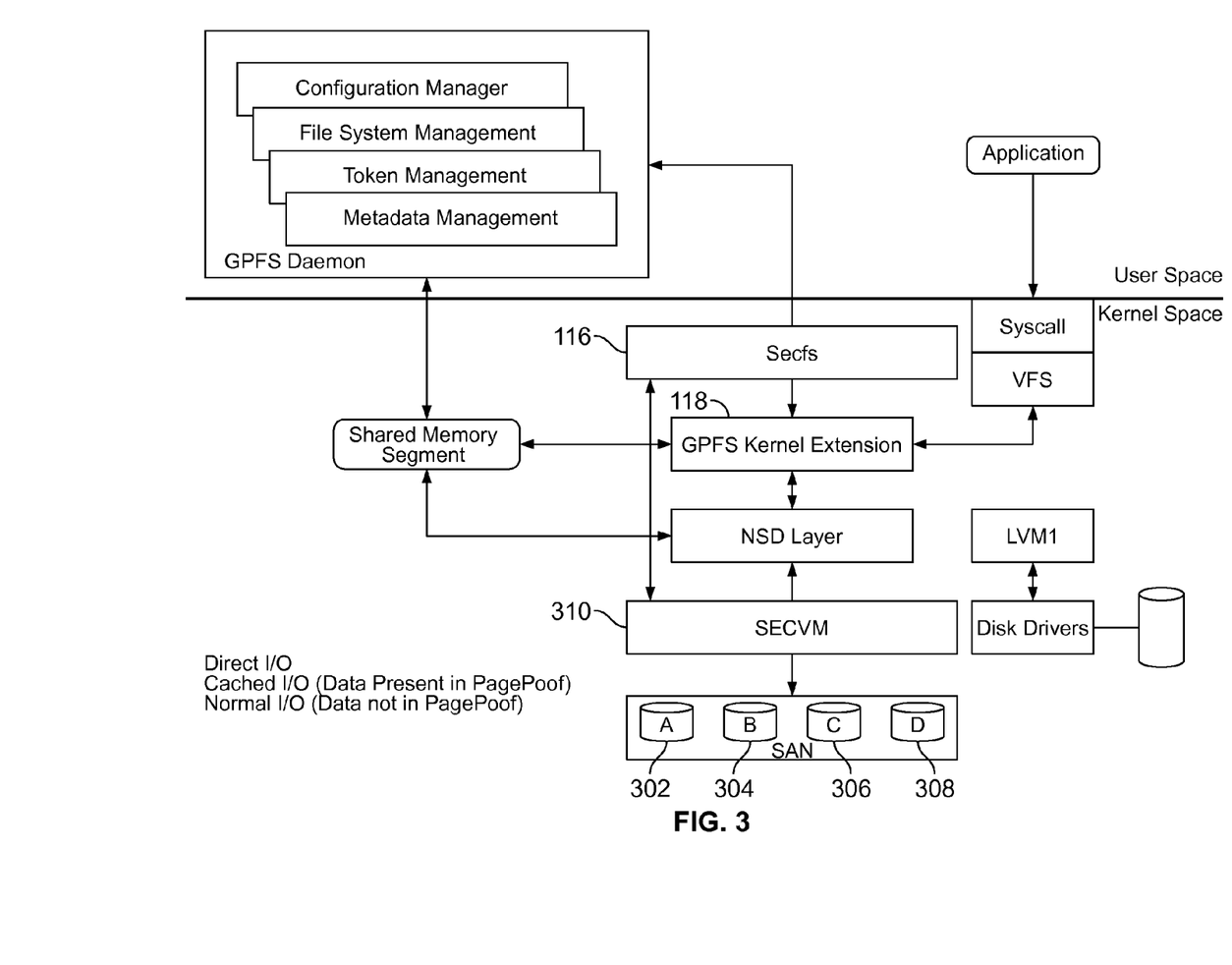
FIG. 3 is an architecture diagram depicting a layering of a secure file system (secfs) over a cluster file system, and a secure volume manager (secvm) below the cluster file system in accordance with some embodiments.

File encryption over a cluster file system is performed in the Vormetric secvm 310 (secure volume manager) layer in conjunction with file based policies enforced at secfs 116. In this architecture, the secvm module 310 is layered over hdisk (hard disk) devices allocated to GPFS 118 as secvmdisk (secure volume manager disk) NSD (network shared device) type. As an aside example, GPFS introduced support for secvmdisk NSD type starting with GPFS 3.4.0.11 and 3.5.0.2. A file system composed of secvmdisk devices can be protected by the Vormetric agent. Using mmcrnsd (e.g., a command to create a network shared device), a device can be added to GPFS as secvmdisk type. Using mmcommon, a NSD type of a device can be changed to secvmdisk from hdisk or vice versa.

FIG. 3 provides a high level architectural view of layering secfs 116 over GPFS 118 and secvm 310 below GPFS 118. In this diagram, LUNs (logical unit number, e.g., an identifier for a storage device) A and B represent NSDs of secvmdisk type, while B and D are of hdisk type.

In general, encryption of I/O requests at block level cannot achieve encryption at file level granularity without specific information that identifies association of an I/O request to a file, a target offset within the file, and a specific key for encryption of the file. Although such information is not available to block device drivers, the cluster file system, such as GPFS, provides some information to the device driver supporting secvmdisk NSD. The driver for secvmdisk NSD is secvm 310 layered over native hdisk devices, and the supplied information enables secvm 310, through upcalls to secfs 116, to identify GuardPoint (i.e., whether security is enabled), the file to which an I/O request belongs (i.e., the file being written or read), and the file offset (i.e., what part of the file is being read or written) at which I/O request starts. Encryption at block level completely eliminates the correctness issues with I/O operations described above.

By pushing encryption down to the secvm 310 level, the secfs module 116 enables GuardPoints and enforces access policies. Because policies are atomically applied to all members of a cluster file system cluster 120, policy enforcement at GuardPoint or file level does not have to be performed in a cluster-wide context in some embodiments.

Figure 4:
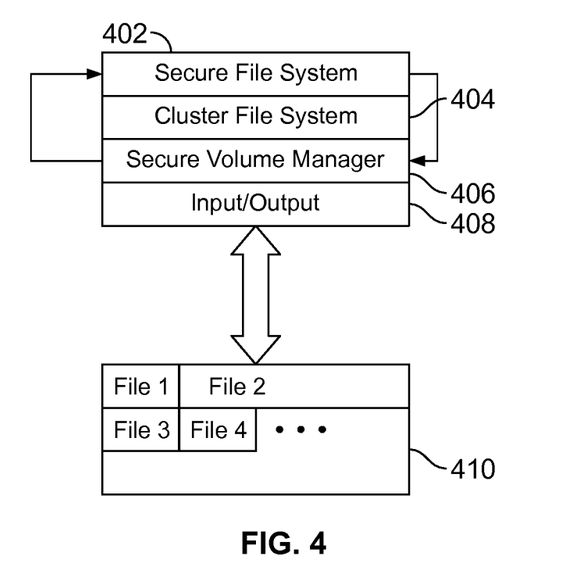
FIG. 4 is an architecture diagram showing the secure file system and the secure volume manager of FIG. 3 managing security of files in accordance with some embodiments.

FIG. 4 shows a secure file system module 402 and a secure volume manager module 406 cooperating to manage the security of files read from or written to a storage 410 by an input/output module 408, while the cluster file system 404 manages data coherency of the files. When a read or write request for a file is passed down from the secure file system module 402 to the secure volume manager 406, via the cluster file system module 404, the cluster file system module 404 locks the file (e.g., File 1, File 2, File 3 or File 4) so that other applications cannot access the file in conflicting mode. The secure volume manager 406 makes an up call to the secure file system module 402, in order to obtain information about the file type of the file. The purpose of making the up call is for the secure volume manager 406 to determine if the file referenced by the read or write request is a file that is managed, i.e., encrypted and decrypted, by the secure volume manager 406 and the secure file system 402. The secure file system module 402 communicates the file type of the file to the secure volume manager 406. If the file type of the file indicates the file is a secure file, the secure file system module 402 also sends along one or more keys to the secure volume manager 406. For example, the secure file system module 402 could send the key itself, or a pointer to the key.

Still referring to FIG. 4, if the file is not a secure file, for example if the file type is hdisk, the secure volume manager 406 does not perform any encryption or decryption operations, and the file passes upward through the layers (i.e., up through the modules) in the case of a read, or downward through the layers (i.e., down through the modules) in the case of a write. That is, for writing a non-secure file, the file passes downward through the secure file system module 402, the cluster file system module 404, the secure volume manager 406 and the input/output module 408 into the storage 410. For reading a non-secure file, the file passes upward from the storage 410 through the input/output module 408, the secure volume manager module 406, the cluster file system module 404 and the secure file system module 402.

If the file is a secure file, the secure volume manager 406 performs an encryption or decryption operation as appropriate to a write or a read operation. To do so, the secure volume manager 406 applies an encryption key or a decryption key as provided by the secure file system module 402. The secure volume manager 406 encrypts an unencrypted file passed down from the secure file system module 402 for a write operation, then passes the newly encrypted file down to the input/output module 408 for writing to the storage 410. The secure volume manager decrypts an encrypted file brought up by the input/output module 408 from the storage 410 for a read operation, then passes the newly decrypted file up to the secure file system module 404. Secure files follow the same path as non-secure files, but with encryption or decryption performed by the secure volume manager 406 as appropriate.

Figure 5:
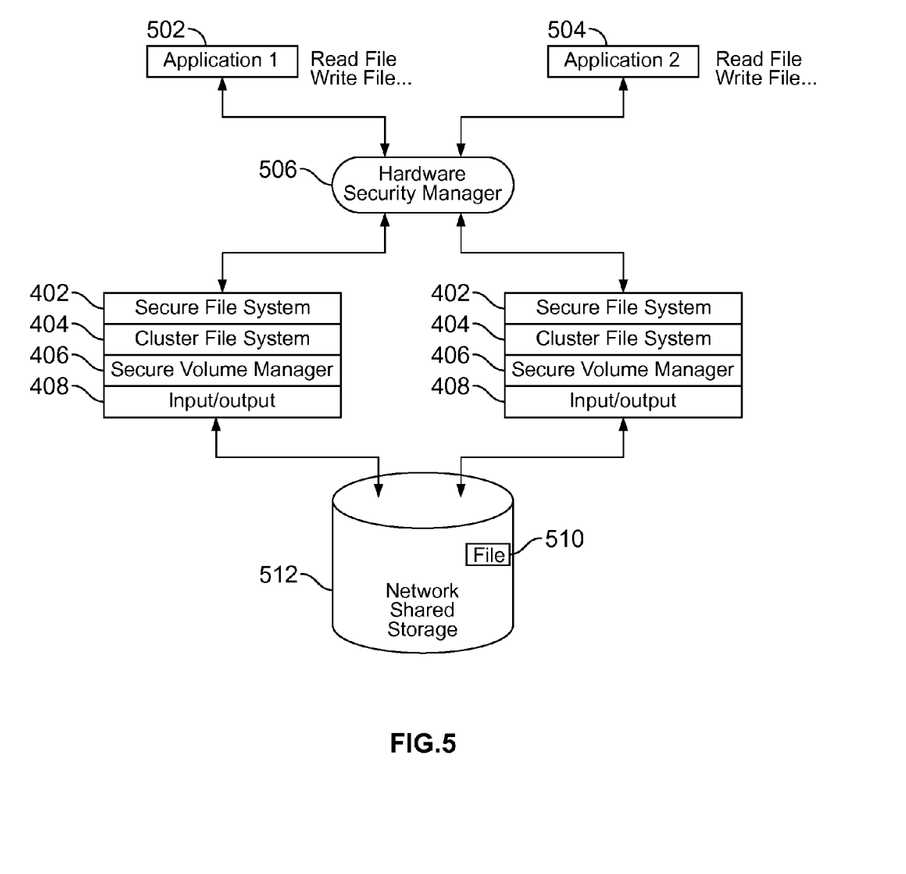
FIG. 5 is an architecture diagram depicting a hardware security manager, which has a secure file system, a cluster file system, and a secure volume manager as shown in accordance with some embodiments.

FIG. 5 shows an operating scenario in which two applications 502, 504 in a computing cluster are attempting to access the same file 510 in a shared storage 512. The first application 502 (i.e., Application 1) communicates through a hardware security manager 506 and is attempting to read the file 510 or write the file 510. The second application 504 (i.e., Application 2) communicates through hardware security manager 506 and is also attempting to read the file 510 or write to the file 510. For example, the second application 502 could be a second instance of the first application 502 reading the same file 510 or writing the same file 510, or the second application 502 could be another application altogether in other embodiments. In distributed parallel multiprocessing environments, the second application 504 could be a portion of the first application 502. If the first application 502 succeeds in accessing the file 510 before the second application 502 can do so, the cluster file system 404 locks the file 510, preventing the second application 504 from accessing the file 510 until after the file 510 is again unlocked. While the file 510 is locked, the first application 502 can write to the file 510 or read from the file 510, with encryption and decryption handled by the secure file system 402 and secure volume manager 406 in accordance with the file type of the file 510. Once the first application 502 completes the read or write operation to the file 510, the file 510 is released and the cluster file system 404 unlocks the file 510. Similarly, if the file 510 is unlocked and the second application 504 accesses the file 510, the cluster file system 404 locks the file 510, preventing the first application 502 (or any other application) from accessing the file 510 until after the file 510 is again unlocked. It should be appreciated that the applications may communicate with multiple hardware security managers in some embodiments.

Figure 6:
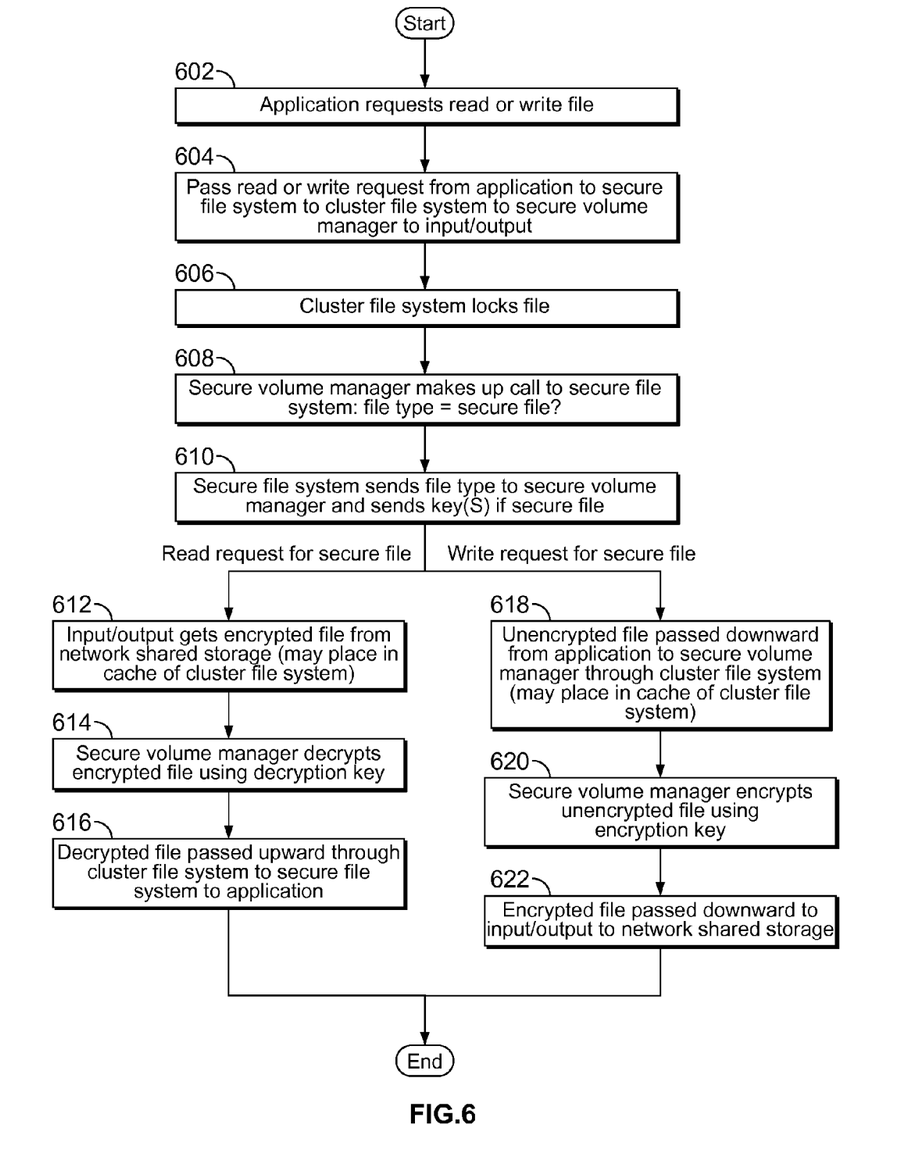
FIG. 6 is a flow diagram showing a method of managing file security in a cluster environment, which can be practiced using the architectures of FIGS. 1-5 in accordance with some embodiments.

FIG. 6 shows a flow diagram of a method of managing file security in accordance with some embodiments. Various embodiments of the method can be practiced using embodiments of the systems shown in FIGS. 1-5, as discussed in examples given below. It should be appreciated that the method can be practiced using a specially programmed processor in some embodiments. After a start point, an application requests a read of a file or a write to a file, in an action 602. The read or write request is passed from the application to the secure file system, then to the cluster file system, then to the secure volume manager, then to the input/output. For example, the read or write request could be passed from the application to a secure file system layer or module, from the secure file system to a cluster file system layer or module, from the cluster file system to a secure volume manager layer or module, and from the secure volume manager to an input/output layer or module, as shown and described in FIGS. 1-5.

Still referring to FIG. 6, in an action 606, the cluster file system locks the file. For example, the cluster file system layer or module could lock the file or a portion of the file, preventing another application or another portion of the first application from reading or writing to that file or that portion of the file. The secure volume manager makes an up call to the secure file system, in an action 608. The purpose of the up call is for the secure volume manager to determine whether the file type of the file indicates that this is a secure file. Various mechanisms for an up call and formats for the communications of the up call and the reply to the up call can be devised. For example, the secure volume manager could send a message, a request or a query to the secure file system layer or module. An up call is shown as an arrow on the left side of the diagram in FIG. 4, as an example.

Continuing with FIG. 6, the secure file system sends the file type to the secure volume manager, in an action 610. Various mechanisms for doing so can be devised. For example, the secure file system could send a message or a reply to the secure volume manager that includes the actual file type or a characterization of the file type, or could set or clear a bit or a flag, and so on. A reply from the secure file system to the secure volume manager is shown as an arrow on the right side of the diagram in the FIG. 4, as an example. If the file is a secure file, the secure file system sends the key or keys to the secure volume manager. For example, the secure file system could send an actual key (i.e., the data forming the key), or a pointer to a key. In one version, sending the key acts as an indication that the file is a secure file. The key could be an encryption key, in the case of a write request for a secure file, or a decryption key, in the case of a read request for a secure file.

The bottom left portion of the flow diagram of FIG. 6 depicts actions 612, 614, 616 taken in the case of a read request for a secure file. In an action 612, the input/output receives or obtains the encrypted file from a shared storage. For example, when the read request is for a secure file, the file is available in encrypted form on a network shared storage managed by the cluster file system, and the input/output layer or module fetches the encrypted file from the shared storage as shown in FIG. 5. In one embodiment, the encrypted file is placed in a cache of the cluster file system. The secure file system decrypts the encrypted file using a decryption key, in an action 614. The use of decryption keys is well understood, and various mechanisms for applying a decryption key are readily devised. As described above, the decryption key is obtained from the secure volume manager, in the action 610.

The decrypted file is passed upward through the cluster file system to the secure file system, and then to the application, in an action 616 of FIG. 6. For example, the decrypted file that is being read could be passed from the secure volume manager, to the cluster file system, then from the cluster file system to the secure file system, and from the secure file system to the application. It should be appreciated that the cluster file system controls the locking and unlocking of the file or the portion of the file in accordance with the passing of the file through the cluster file system, and in cooperation with various applications executing in the cluster environment.

The bottom right portion of the flow diagram of FIG. 6 depicts actions 618, 620, 622 taken in the case of a write request for a secure file. In an action 618, the unencrypted file is passed downward from the application to the secure volume manager, through the cluster file system. For example, the unencrypted file that is being written as a secure file could be passed from the application to the secure file system, from the secure file system to the cluster file system, and from the cluster file system to the secure volume manager. In one embodiment, the unencrypted file is placed in a cache of the cluster file system. The secure volume manager encrypts the unencrypted file, using an encryption key, in an action 620. The use of encryption keys is well understood, and various mechanisms for applying an encryption key are readily devised. As described above, the encryption key is obtained from the secure volume manager, in the action 610.

The encrypted file is passed downward to the input/output, and to the shared storage of FIG. 6. For example, after the file is encrypted in the action 620, the file is passed from the secure volume manager to the input/output layer or module. The input/output layer or module writes the file to the shared storage. It should be appreciated that the cluster file system controls the locking and unlocking of the file or the portion of the file in accordance with the passing of the file through the cluster file system, and in cooperation with various applications executing in the cluster environment.

In this manner, the secure volume manager encrypts and decrypts files using a key or keys obtained from the secure file system, without need of directly controlling locking and unlocking of files. The cluster file system controls locking and unlocking of the files, without needing to know whether any of the files are secure (i.e., encrypted/decrypted). That is, the encryption and decryption of files are decoupled from the locking and unlocking of files. With the secure file system and the secure volume manager sandwiching the cluster file system, various secure files and non-secure files can be accessed in a shared storage by applications in a cluster environment. The secure file system and the secure volume manager operate respectively above and below the cluster file system, passing files through the cluster file system for locking and unlocking, while handling encryption and decryption duties.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The embodiments can also be embodied as computer readable code on a computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of managing file security in a multi-host cluster environment, comprising:
   passing a request for a file from a secure file system layer process local to one of a plurality of hosts in the multi-host cluster environment through a cluster file system layer process local to the one of the plurality of hosts to a secure volume manager layer process local to the one of the plurality of hosts, wherein the file is to be written to or read from a network shared storage coupled to the plurality of hosts;
   locking at least a portion of the file as affected by the request, at the cluster file system layer process, the locking preventing access by other requests;
   passing one or more keys from the secure file system layer process to the secure volume manager layer process;
   decrypting, via application of the one or more keys at the secure volume manager layer process, the file as received, in response to the request for the file including a read request for the file, prior to sending the decrypted file to the secure file system layer process; and
   encrypting, via application of the one or more keys at the secure volume manager layer process, the file as received, in response to the request for the file including a write request for the file, prior to sending the encrypted file to an input/output layer process, wherein at least one method operation is executed through a processor.

2. The method of claim 1, further comprising:
   making an up call from the secure volume manager layer process to the secure file system layer process, in response to receiving the request at the secure volume manager layer process, to determine whether the file is a secure file.

3. The method of claim 1, wherein the file is a secure file and passing one or more keys is in response to an up call received by the secure file system layer process from the secure volume manager layer process.

4. The method of claim 1, wherein the cluster file system layer process has a general parallel file system.

5. The method of claim 1, further comprising:
   communicating a file type of the file from the secure file system layer process to the secure volume manager layer process, the file type indicating whether the file is a secure file.

6. The method of claim 1, wherein one of the decrypting or the encrypting is performed when the file has a file type indicating a secure file, the file type communicated from the secure file system layer process down to the secure volume manager layer process.

7. The method of claim 1, wherein:
   the cluster file system layer process controls which application acquires a lock, without encryption awareness; and
   the secure file system layer process and the secure volume manager layer process control encryption and decryption, without cluster awareness.

8. A tangible, non-transient, computer-readable medium having instructions thereupon which, when executed by a processor, cause the processor to perform a method comprising:
   passing a read request for a first file, from a secure file system layer process local to one of a plurality of hosts in a multi-host cluster environment through a cluster file system layer process local to the one of the plurality of hosts to a secure volume manager layer process local to the one of the plurality of hosts;
   passing a decryption key from the secure file system layer process to the secure volume manager layer process;
   applying the decryption key at the secure volume manager layer process to the first file as received from an input/output layer process to produce a first decrypted file, the first file locked by the cluster file system layer process from further access while the input/output layer process accesses and transfers the first file in encrypted form from a network shared device coupled to the plurality of hosts;
   passing a write request for a second file, from the secure file system layer process through the cluster file system layer process to the secure volume manager layer process;
   passing an encryption key from the secure file system layer process to the secure volume manager layer process; and
   applying the encryption key at the secure volume manager layer process to the second file as received from the secure file system layer process to produce a second encrypted file, the second file locked by the cluster file system layer process from the further access while the input/output layer process accesses and transfers the second file in encrypted form to the network shared device.

9. The computer-readable medium of claim 8, wherein the cluster file system layer process provides concurrent file access to applications, with the applications running on multiple nodes of clusters.

10. The computer-readable medium of claim 8, wherein:
    the first file locked by the cluster file system layer process includes:
      locking the first file, via the cluster file system layer process, in response to receiving the read request at the cluster file system layer process; and
      unlocking the first file, via the cluster file system layer process, in response to a release of the first file; and
    the second file locked by the cluster file system layer process includes:
      locking the second file, via the cluster file system layer process, in response to receiving the write request at the cluster file system process; and
      unlocking the second file, via the cluster file system layer process, in response to a release of the second file.

11. The computer-readable medium of claim 8, wherein the method further comprises:
    providing an up call from the secure volume manager layer process to the secure file system layer process, in response to receiving the read request at the secure volume manager layer process, the up call acting as a request to the secure file system layer process for a determination of whether the first file is encrypted.

12. The computer-readable medium of claim 8, wherein the method further comprises:
    providing an up call from the secure volume manager layer process to the secure file system layer process, in response to receiving the write request at the secure volume manager layer process, the up call acting as a request to the secure file system layer process for a determination of whether the second file is to be encrypted.

13. The computer-readable medium of claim 8, wherein passing the decryption key is in response to receiving an up call at the secure file system layer process from the secure volume manager layer process, and the first file being encrypted.

14. The computer-readable medium of claim 8, wherein passing the encryption key is in response to receiving an up call at the secure file system layer process from the secure volume manager layer process, and the second file to be encrypted.

15. A secure, multi-host cluster-based system comprising:
a plurality of hosts configured to couple to a network shared device for file storage;
each host of the plurality of hosts having a secure file system module specific to the host and a secure volume manager specific to the host, each host including at least one processor, and the secure file system module and the secure volume manager configured to sandwich a cluster file system module specific to the host;
the secure file system module configured to:
provide one of a read request or a write request from an application to the secure volume manager, via the cluster file system module, the one of the read request or the write request referencing a file;
pass one or more keys down to the secure volume manager;
pass a first unencrypted file as the file from the application to the secure volume manager, via the cluster file system module, in response to receiving the write request; and
pass a decrypted file as the file from the secure volume manager to the application, in response to receiving the read request; and
the secure volume manager configured to:
produce the decrypted file via application of the one or more keys to a first encrypted file received as the file from the network shared device, in response to receiving the read request; and
produce a second encrypted file via application of the one or more keys to the unencrypted file, in response to receiving the write request, the second encrypted file sent as the file to the network shared device, wherein the cluster file system module locks, relative to the network shared device, the file.

16. The secure, cluster-based system of claim 15, further comprising:
the secure volume manager configured to make an up call to the secure file system module, to determine whether the file is managed by the secure file system module and the secure volume manager with encryption or decryption.

17. The secure, cluster-based system of claim 15, further comprising:
the secure volume manager configured to make an up call to the secure file system module in response to receiving the read request or the write request at the secure volume manager; and
the secure file system module configured to send to the secure volume manager a file type of the file in response to receiving the up call, the file type indicating whether the file is a secure file.

18. The secure, cluster-based system of claim 15, wherein the one or more keys are passed down to the secure volume manager in response to the secure file system module receiving an up call from the secure volume manager.

19. The secure, cluster-based system of claim 15, wherein the one or more keys includes an encryption key or a decryption key for the file, the file secured by the secure file system module and the secure volume manager.

20. The secure, cluster-based system of claim 15, wherein:
the cluster file system module includes a cache memory in which the first encrypted file resides prior to decryption by the secure volume manager; and
the unencrypted file or file portion resides in the cache memory prior to encryption by the secure volume manager.

* * * * *